United States Patent
Porter et al.

(10) Patent No.: US 12,378,104 B2
(45) Date of Patent: Aug. 5, 2025

(54) SYSTEMS AND METHODS FOR MATERIAL HANDLING VEHICLE SAFETY REINFORCEMENT

(71) Applicant: The Raymond Corporation, Greene, NY (US)

(72) Inventors: Randy D. Porter, Greene, NY (US); Joshua D. Vanderpool, Windsor, NY (US)

(73) Assignee: The Raymond Corporation, Greene, NY (US)

( * ) Notice: Subject to any disclaimer, the term of this patent is extended or adjusted under 35 U.S.C. 154(b) by 325 days.

(21) Appl. No.: 18/126,304

(22) Filed: Mar. 24, 2023

(65) Prior Publication Data

US 2023/0303375 A1 Sep. 28, 2023

Related U.S. Application Data

(60) Provisional application No. 63/323,888, filed on Mar. 25, 2022.

(51) Int. Cl.
*B66F 17/00* (2006.01)
*A62B 35/00* (2006.01)
(Continued)

(52) U.S. Cl.
CPC ........ *B66F 17/003* (2013.01); *A62B 35/0018* (2013.01); *A62B 35/0043* (2013.01);
(Continued)

(58) Field of Classification Search
CPC .... B66F 17/003; B66F 9/0755; B66F 9/0759; B66F 9/075; B66F 9/07504;
(Continued)

(56) References Cited

U.S. PATENT DOCUMENTS 9,355,065 B2 * 5/2016 Donahue ................. G06F 17/00
9,978,186 B2 5/2018 LaFergola et al.
(Continued)

FOREIGN PATENT DOCUMENTS

| GB | 2492332 A | 1/2013 |
|---|---|---|
| WO | 2023275675 A2 | 1/2023 |

OTHER PUBLICATIONS

European Patent Office, Extended Search Report, Application No. 23163981.6, Aug. 24, 2023, 5 pages.

*Primary Examiner* — Muhammad Shafi
(74) *Attorney, Agent, or Firm* — Quarles & Brady LLP

(57) ABSTRACT

Systems, methods, and media for safety reinforcement for a personal protective equipment (PPE) device for a material handling vehicle are provided. The safety reinforcement system can include a control unit co-located with the material handling vehicle and configured to receive an identification from the PPE device, communicate the identification to a server, receive an operating routine for the identified PPE device from the server in response to the identification, receive a first operational data from the PPE device, and transmit a limiting instruction to a subsystem of the material handling vehicle according to the operating routine. The operating routine may comprise at least one of a translation routine and a governing rule. The limiting instruction may limit a function of the material handling vehicle.

19 Claims, 11 Drawing Sheets

(51) Int. Cl.
    *H04W 4/40* (2018.01)
    *H04W 4/90* (2018.01)
(52) U.S. Cl.
    CPC ........... *A62B 35/0093* (2013.01); *H04W 4/40* (2018.02); *H04W 4/90* (2018.02)
(58) Field of Classification Search
    CPC ............ B66F 9/07581; A62B 35/0018; A62B 35/0043; A62B 35/0093; A62B 35/0025; H04W 4/40; H04W 4/90; H04W 4/30; F16P 3/147
    USPC .......................................................... 701/50
    See application file for complete search history.

(56) References Cited

U.S. PATENT DOCUMENTS

| | | | |
|---|---|---|---|
| 10,043,368 B1 | 8/2018 | Fonzi, III et al. | |
| 10,207,128 B2 | 2/2019 | Hetrich | |
| 10,328,294 B2 | 6/2019 | Hetrich et al. | |
| 10,338,603 B2* | 7/2019 | Vanderpool | G06Q 10/087 |
| 10,425,128 B2* | 9/2019 | Kirk | G07C 5/008 |
| 2008/0154691 A1* | 6/2008 | Wellman | G05D 1/0297 |
| | | | 705/7.26 |
| 2013/0153335 A1* | 6/2013 | Luminet | A42B 3/046 |
| | | | 182/112 |
| 2014/0278621 A1* | 9/2014 | Medwin | G06Q 10/0631 |
| | | | 705/7.12 |
| 2018/0211345 A1* | 7/2018 | Bean | G01S 11/06 |
| 2019/0308041 A1 | 10/2019 | Harding et al. | |
| 2020/0198952 A1* | 6/2020 | Lepoutre | B66F 17/006 |
| 2020/0222732 A1* | 7/2020 | Rutkowski | A62B 35/0037 |

* cited by examiner

SYSTEMS AND METHODS FOR MATERIAL HANDLING VEHICLE SAFETY REINFORCEMENT

CROSS-REFERENCE TO RELATED APPLICATIONS

This application claims the benefit of U.S. Provisional Patent Application No. 63/323,888 filed Mar. 25, 2022, which is incorporated herein by reference in its entirety.

STATEMENT REGARDING FEDERALLY SPONSORED RESEARCH

Not applicable.

BACKGROUND

Various types of material handling vehicles include a platform that elevates the material handling vehicle operator during operation of the material handling vehicle. These types of material handling vehicles include a fall protection system consisting of either a restraining means such as a guard rail system or an operator fall protection system. The operator fall protection system is one of many types of personal protective equipment, commonly referred to as "PPE", which is equipment worn or utilized by an operator to minimize exposure to potential hazards in a workplace.

Most PPE is subject to compliance with various regulatory standards, such as those instituted by the Occupational Safety and Health Administration (OSHA) and the National Institute for Occupational Safety and Health (NIOSH). These standards contain information regarding the use of safety equipment, as well as the need for proper inspection, monitoring, and record keeping.

In addition, for certain types of vehicles there are training requirements imposed by various government agencies, laws, rules and regulations. For example, OSHA imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environment, and always look in the direction of travel.

BRIEF SUMMARY

The present disclosure describes novel safety reinforcement systems, methods, and media for assisting warehouse management systems and/or personnel in supervising material handling vehicle ("MHV") operators and other personnel within the warehouse space by reinforcing safety regarding the use of required PPE attendant to the operation of a MHV.

According to some aspects of the present disclosure, a safety reinforcement system for a PPE device for a material handling vehicle are provided. The system can include a control unit co-located with the material handling vehicle and configured to receive via wireless communication an identification from the PPE device, communicate the identification to a server, receive an operating routine for the identified PPE device from the server in response to the identification, receive via wireless communication a first operational data from the PPE device, and transmit a limiting instruction to a subsystem of the material handling vehicle according to the operating routine.

According to some aspects of the present disclosure, a safety reinforcement method for a PPE device for a material handling vehicle are provided. The method can include receiving an identification from the PPE device via a control unit co-located with the material handling vehicle, communicating the identification to a server via the control unit, receiving, via the control unit, an operating routine for the identified PPE device from the server in response to the identification, receiving a first operational data from the PPE device via the control unit, and transmitting, via the control unit and according to the operating routine, a limiting instruction to a subsystem of the material handling vehicle.

According to some aspects of the present disclosure, a safety reinforcement system for a PPE device for a material handling vehicle are provided. The system can include a control unit configured to receive, via communicative coupling, an identification from the PPE device, communicate the identification to a server, receive a governing rule and a translation routine associated with the identified PPE device from the server in response to the identification, receive an operational data from the PPE device, translate the operational data according to the translation routine, determine whether the translated operational data indicates a violation of the governing rule, and limit a function of the material handling vehicle in response to the determined violation.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1A:
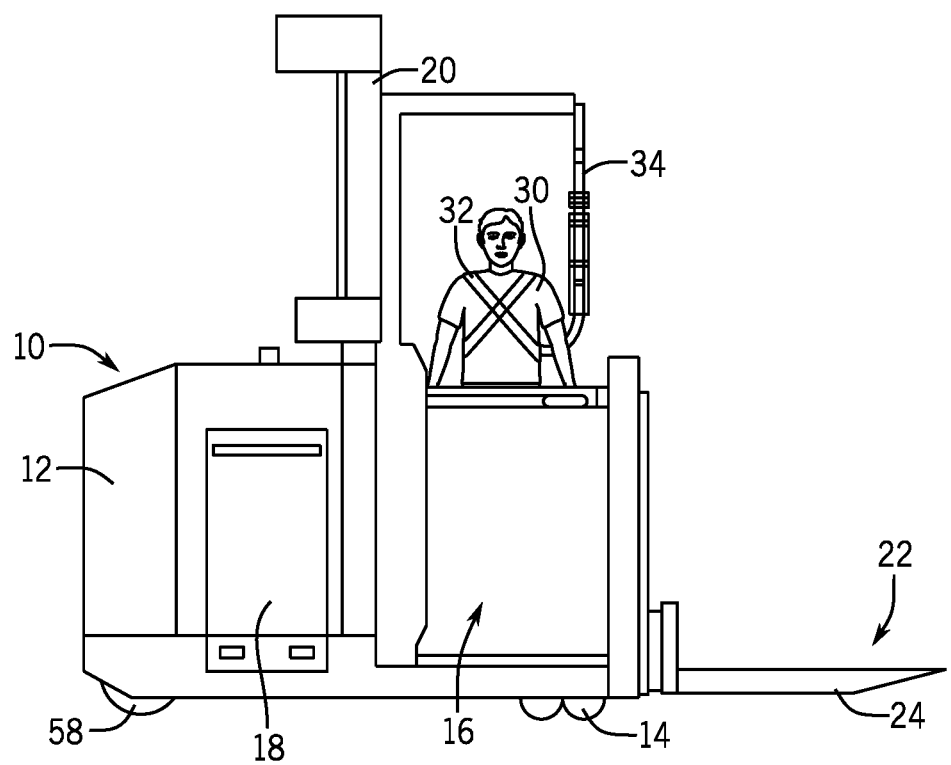
FIG. 1A is a side perspective view of a MHV, according to aspects of the present disclosure.

Before any aspects of the present disclosure are explained in detail, it is to be understood that the present disclosure is not limited in its application to the details of construction and the arrangement of components set forth in the following description or illustrated in the following drawings. The present disclosure is capable of other aspects and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Likewise, "at least one of A, B, and C," and the like, is meant to indicate A, or B, or C, or any combination of A, B, and/or C. Unless specified or limited otherwise, the terms "mounted," "secured," "connected," "supported," and "coupled" and variations thereof are used broadly and encompass both direct and indirect mountings, connections, supports, and couplings. Further, "connected" and "coupled" are not restricted to physical or mechanical connections or couplings.

It is also to be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

It should be appreciated that material handling vehicles are designed in a variety of classes and configurations to perform a variety of tasks. It will be apparent to those of skill in the art that the present disclosure is not limited to any specific material handling vehicle, and can also be provided with various other types of material handling vehicle classes and configurations, including for example, lift trucks, forklift trucks, reach trucks, SWING REACH® vehicles, turret trucks, side loader trucks, counterbalanced lift trucks, pallet stacker trucks, order pickers, transtackers, tow tractors, and man-up trucks, and can be commonly found in warehouses, factories, shipping yards, and, generally, wherever pallets, large packages, and/or loads of goods can be required to be transported from place to place. The various systems and methods disclosed herein are suitable for any of operator controlled, pedestrian controlled, remotely controlled, and autonomously controlled material handling vehicles. Further, the present disclosure is not limited to material handling vehicle applications. Rather, the present disclosure may provide for other types of vehicles, such as automobiles, buses, trains, tractor-trailers, farm vehicles, factory vehicles, and the like.

The present disclosure describes novel safety reinforcement systems and methods for assisting warehouse management personnel in supervising MHV operators and other personnel within the warehouse space by reinforcing safety regarding the use of required PPE attendant to the operation of an MHV.

Known PPE devices can include a hardwired interface to the MHV. The hardwired interface only provides a binary status of the PPE condition. The binary status (On or Off) does not allow for setting threshold limits or the collection of the change in a PPE status over time. Further, some known PPE devices include a battery, and it can be useful to know the remaining charge at any particular time, have the ability to convey this information to the warehouse manager and/or the MHV operator, and set a discharge limit where the PPE device's information is no longer dependable. A hardwired binary (On or Off) interface does not allow for novel systems and methods to track a PPE device's performance or condition over time, and to track PPE related data for supervisor notifications, situational awareness, identification of actions that can be taken by the warehouse supervisor, and control of MHV systems based upon the PPE related data.

Generally, the present disclosure provides systems and methods for managing PPE devices, for example used in connection with a MHV, that can communicate status information. In some embodiments, the disclosed systems and methods can control operation of the MHV based on the communicated status information from the PPE and/or report status to a warehouse management system or other server. While such systems are discussed primarily with respect to material handling vehicles in a warehouse setting, it should be appreciated that the various aspects of the disclosure can be applied to other vehicles and environments as well.

The systems and methods described herein can include the use of a telematics system and the communication of the PPE related data to allow for supervisor notifications, situational awareness, identification of actions that can be taken by the warehouse supervisor, and control of MHV systems based upon the PPE related data. In some embodiments, the telematics system can be integrated with a material handling vehicle fleet management system, such as a warehouse management system.

The safety reinforcement systems and methods can serve as a safety reinforcement tool and training reinforcement tool to among other things provide notice regarding an operator's use of PPE that is or is not consistent with facility rules in the warehouse environment. It is not intended as a replacement for the training or safety requirements that an operator assume and maintain a proper operator position and follow various aspects of their operator training.

In some embodiments, a warehouse management system, or a facilities manager, in exercising their duty to supervise operation of their MHV fleet (e.g., a fleet of forklifts), may be able to adjust the functionality of the safety reinforcement system to meet operational conditions resident in the facility. For example, the facilities manager could set a minimum and a maximum desired speed of the MHV when the safety reinforcement system is sensing a particular PPE condition.

FIG. 1A illustrates an exemplary MHV 10 that includes a body 12 having a plurality of wheels 14 and defining an operator compartment 16 including one or more controls and/or displays. The operator compartment may be configured to accommodate an operator of the MHV 10. The operator may be required to wear and/or use one or more PPE devices, for example a self-retractable lanyard 34 attached to a safety harness 32 worn by the operator 30. The body 12 may accommodate a battery 18 or other power source and may house one or more motors (not shown). The MHV 10 may include a mast 20 coupled to the body 12 for raising and lowering a fork assembly 22 (or, in other embodiments, a platform, an operator cabin such as the operator compartment 16, or other assemblies). That is, the mast 20 can be in the form of a telescoping mast with the fork assembly 22 attached thereto such that the fork assembly 22 can be selectively raised and lowered by the mast 20. The fork assembly 22 may include one or more forks 24 for engaging a pallet or other load (not shown).

The mast 20, fork assembly 22, and the like may be controlled by an operator 30. The operator 30 may be remote, or may be within or in proximity to the MHV 10. In various examples, the operator 30 controls the MHV 10 so that the forks 24 of the fork assembly 22 can engage a pallet or other load (not shown). Further, the fork assembly 22 and thereby the load may be raised or lowered by the mast 20. Once the load is situated on the fork assembly 22, the operator 30 can move the load, for example by moving the MHV 10, to another location as needed.

Figure 1B:
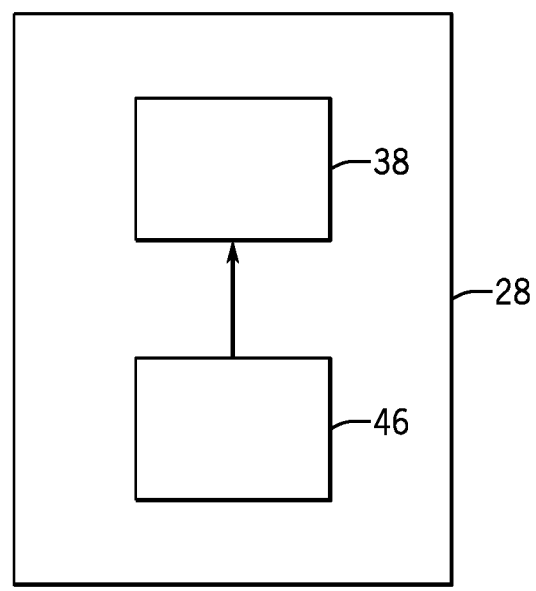
FIG. 1B is a schematic representation of a PPE device, according to aspects of the present disclosure.

Referring to FIG. 1B, a PPE device 28 according to various embodiments can comprise PPE electronics 38 and a protection portion 46. The protection portion 46 may comprise any suitable system or method for providing the desired protection of the operator, such as a tether, hard hat, or the like. The protection portion 46 may be properly engaged when it is being used in a way that will provide the desired protection, e.g. a tether is latched to a safety harness. The PPE electronics 38 may comprise any suitable device(s) configured to determine a status of the PPE device 28, such as a battery status, the status of protection portion 46, and the like. For example, the PPE electronics 38 may comprise a sensor configured to determine the status of the protection portion 46, such as whether the protection portion 46 (e.g., the latch end of a tether) is properly engaged. The PPE electronics 38 may further comprise any suitable system or method for communicating information pertaining to the PPE device 28, such as the PPE device 28 status, PPE device 28 identification, whether the protection portion 46 is properly engaged or other information regarding proper or improper usage of the PPE device 28, and the like. In some embodiments, the PPE electronics 38 may be configured to communicate such PPE information via a wireless communication standard, for example via Bluetooth.

Figure 3A:
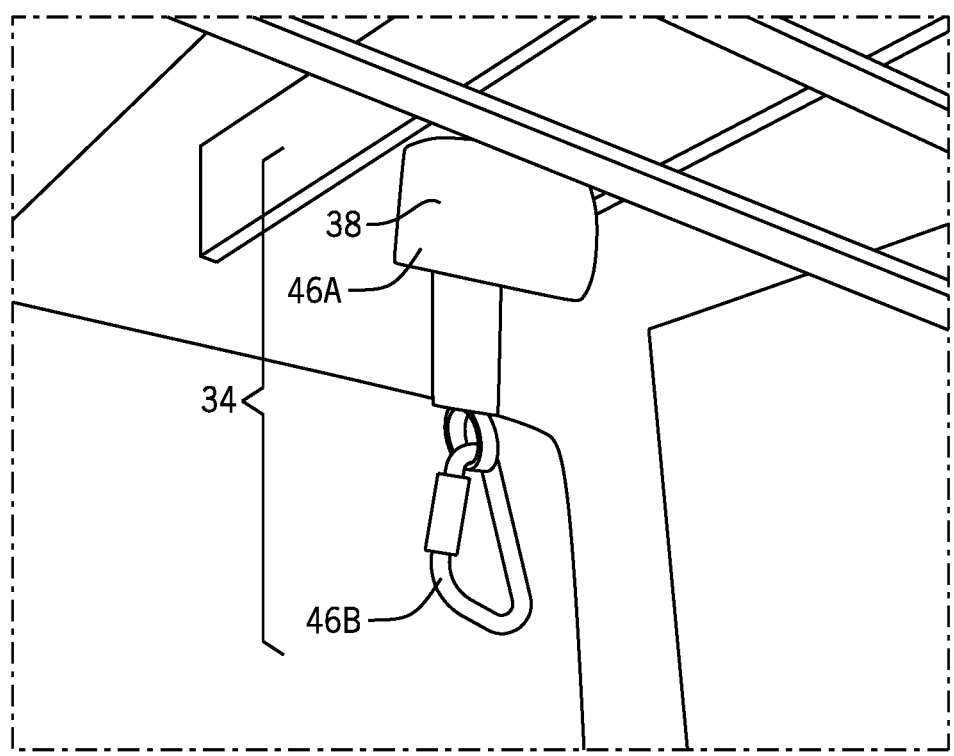
FIG. 3A shows various aspects of a self-retractable lanyard, according to aspects of the present disclosure.
Figure 3B:
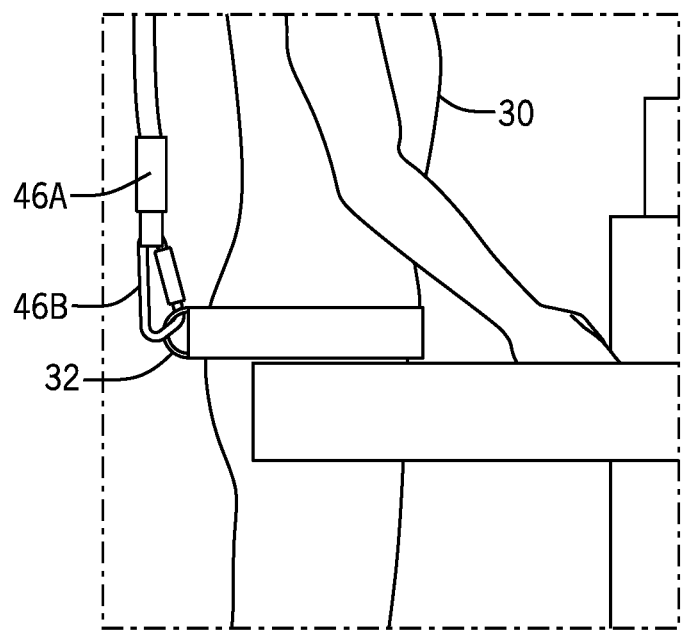
FIG. 3B shows a first exemplary use of a self-retractable lanyard, according to aspects of the present disclosure.
Figure 3C:
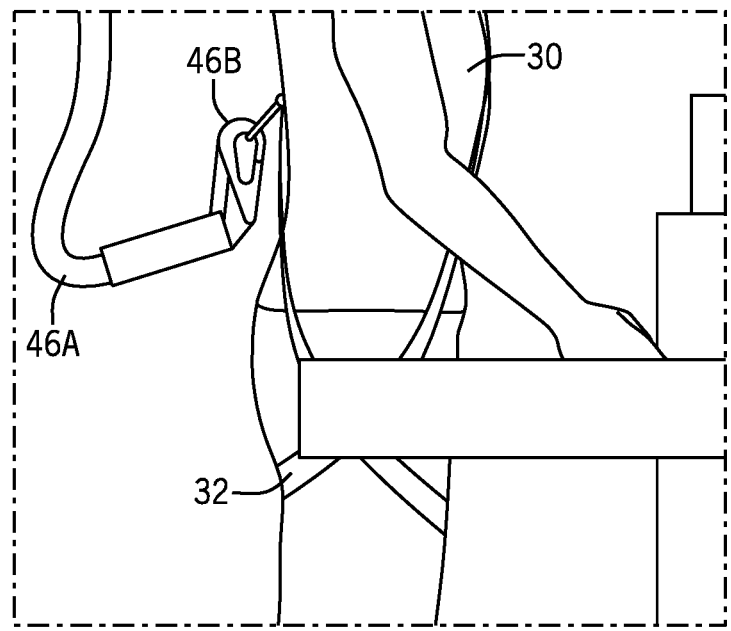
FIG. 3C shows a second exemplary use of a self-retractable lanyard, according to aspects of the present disclosure.

As illustrated in FIGS. 1A and 3A-3C and described above, the MHV 10 can be operated by the operator 30, who may be required to use and/or wear one or more PPE devices 28. Referring briefly to FIGS. 3A-3C, one non-limiting example of a PPE device 28 is a self-retractable lanyard ("SRL") 34. The protection portion 46 of the SRL 34 may comprise a tether portion 46A and a latch portion 46B. The SRL 34 may further comprise PPE electronics 38, for example to communicate PPE information such as battery status, status of the latch portion 46B (e.g., whether the latch is open or closed, and/or whether engaged properly with a safety harness 32). For example, a SRL 34 can be used on a MHV 10 that elevates the operator. The operator 30 of the MHV 10 is shown retained by a safety harness 32 (in the form of a belt (FIG. 3B) or a fully-body harness (FIG. 3C)) that is connected, via the latch portion 46B, to the SRL 34. Other examples of PPE that can be configured to utilize the features disclosed herein can include, but are not limited to hard hats, safety glasses, or a wearable device that can be under or on top of clothing. Wearable PPE devices may include, as non-limiting examples, a helmet, a vest, steel toe shoes or other footwear, or in some other form that can be supported on or worn by the operator 30. In some embodiments, PPE devices 28 may include, as non-limiting examples, gates, railings, other retention devices, pressure plates, occupancy detector, or the like.

Figure 2:
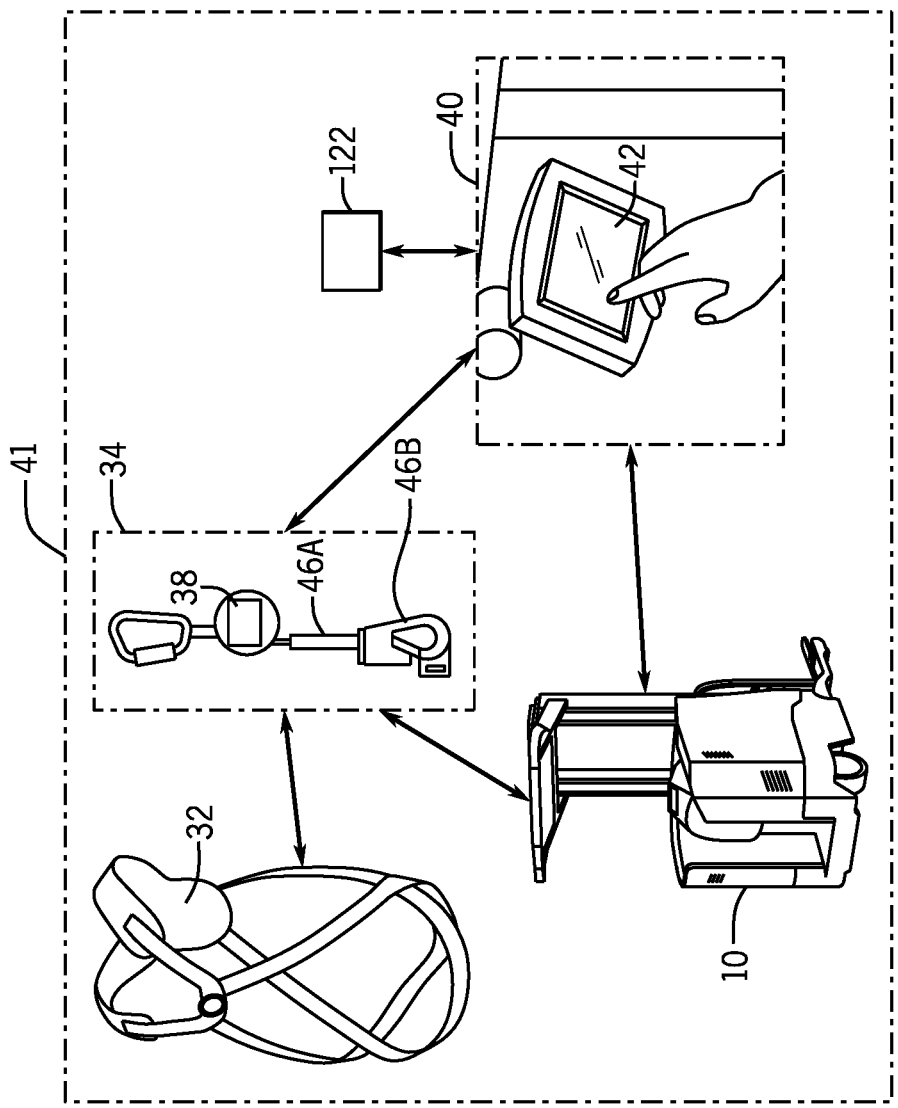
FIG. 2 is a schematic view of a safety reinforcement system, according to aspects of the present disclosure.

Referring to FIG. 2, a telematic controller 40 may form the basis of a safety reinforcement system 41 for the PPE device 28. The safety reinforcement system 41 may be configured to operate with a variety of PPE devices of different types, brands, models, and so on. In some embodiments, the MHV 10, the PPE device 28 (e.g., SRL 34), and the telematic controller 40 may be communicatively coupled to form the safety reinforcement system 41. In some embodiments, the safety reinforcement system 41 may comprise the telematic controller 40 communicatively coupled with a remote server 122 configured to monitor, control, and/or provide guidance (e.g., instructions, limits, rules, etc.) regarding operation of the MHV 10 and the PPE device 28. The remote server 122 may be on-site or off-site. In some embodiments, the remote server 122 may operate a warehouse management system. In some embodiments, the safety reinforcement system 41 may further comprise additional components that facilitate use of the PPE device 28, such as the safety harness 32.

The telematic controller 40 may be configured to collect information about operator 30 and/or MHV 10 performance. The telematic controller 40 may collect (e.g., receive, request, or the like) telemetry and other data from the MHV 10, such as position, speed, motor status, lift height, work element status, operator information, and the like. Such information may be collected, for example, from any combination of a control unit of the MHV 10 and one or more other subsystems of the MHV 10. The telematic controller 40 may interface directly with the subsystem controller of the MHV 10 and/or other various subsystems of the MHV 10, and such interface may comprise wired or wireless communication. For example, the telematic controller 40 may interface with the MHV 10 subsystems and/or subsystem controller via data and control busses in the MHV 10. The telematic controller 40 may collect the PPE information from the PPE device 28, for example by wired or wireless communication. The data collected from the MHV 10 may be referred to herein as MHV data 26, and the PPE information from the PPE device 28 may be referred to herein as PPE operational data 39.

The telematic controller 40 may be further configured to communicate, for example wirelessly, to a remote server 122 that may, for example, be operating a warehouse management system. The telematic controller 40 may communicate to the remote server 122 information received from the MHV 10 and/or PPE device 28. The telematic controller 40 may further receive information and/or instructions (e.g., in the form of operating routine(s)) from the remote server 122. As described in more detail below, the telematic controller 40 may be configured to control or otherwise limit operation of the MHV 10, for example in response to instructions and/or information received from the remote server 122, and/or in response to the MHV data 26 in combination with the PPE operational data 39.

Various components of the safety reinforcement system 41, for example the PPE device 28, telematic controller 40, remote server 122, and/or MHV 10, may comprise one or more control units. For example, referring to FIG. 4, MHV 10 may comprise a control unit 82 configured to send and/or receive information (e.g., including instructions, data, values, signals, or the like) to/from the various components of the MHV 10. The control unit 82 may comprise processing circuitry 84, for example, a processor, DSP, CPU, APU, GPU, microcontroller, application-specific integrated circuit, programmable gate array, and the like, any other digital and/or analog components, as well as combinations of the foregoing (whether distributed, networked, locally connected, or the like), and may further comprise inputs and outputs for receiving and providing control instructions, control signals, drive signals, power signals, sensor signals (e.g., current or voltage sensor output), digital signals, analog signals, and the like. All such computing devices and environments are intended to fall within the meaning of the term "processor," "processing device," or "processing circuitry" as used herein unless a different meaning is explicitly provided or otherwise clear from the context. In some examples, the control unit 82 may comprise one or more such processor devices.

The control unit 82 may comprise processing circuitry 84 configured to execute operating routine(s) 86 stored in a memory 88. The control unit 82 may directly include the memory 88 (e.g., local memory) or may be otherwise communicatively coupled to the memory 88 (e.g., a remote server). The memory 88 may include any suitable volatile memory, non-volatile memory, storage, any other suitable type of storage medium, or any suitable combination thereof. For example, the memory 88 may include RAM, ROM, EEPROM, one or more flash drives, one or more hard disks, one or more solid state drives, one or more optical drives, etc. In some embodiments, the memory 88 (e.g., a media) may have encoded thereon a computer program (e.g., operating routine) for controlling operation of the control unit 82, the MHV 10, the PPE device 28, the telematic controller 40, and the like. In some embodiments, the various components of the MHV 10, PPE device 28, remote server 122, and/or telematic controller 40 may be implemented entirely as software (e.g., operating routine), entirely as hardware, or any suitable combination thereof. In some embodiments, the operating routine(s) 86 may comprise firmware.

Similarly, the PPE electronics 38 may comprise a control unit 50 comprising processing circuitry 56 configured to execute operating routine(s) 59 stored in memory 60, and the telematic controller 40 may also comprise a control unit (not shown) comprising processing circuitry configured to execute operating routine(s) stored in a memory. Further, the remote server 122 may comprise a control unit (not shown) comprising processing circuitry configured to execute operating routine(s) stored in a memory, and may comprise a computer workstation, server, portable computing device, personal computer, cloud computing service, or the like.

Figure 4:
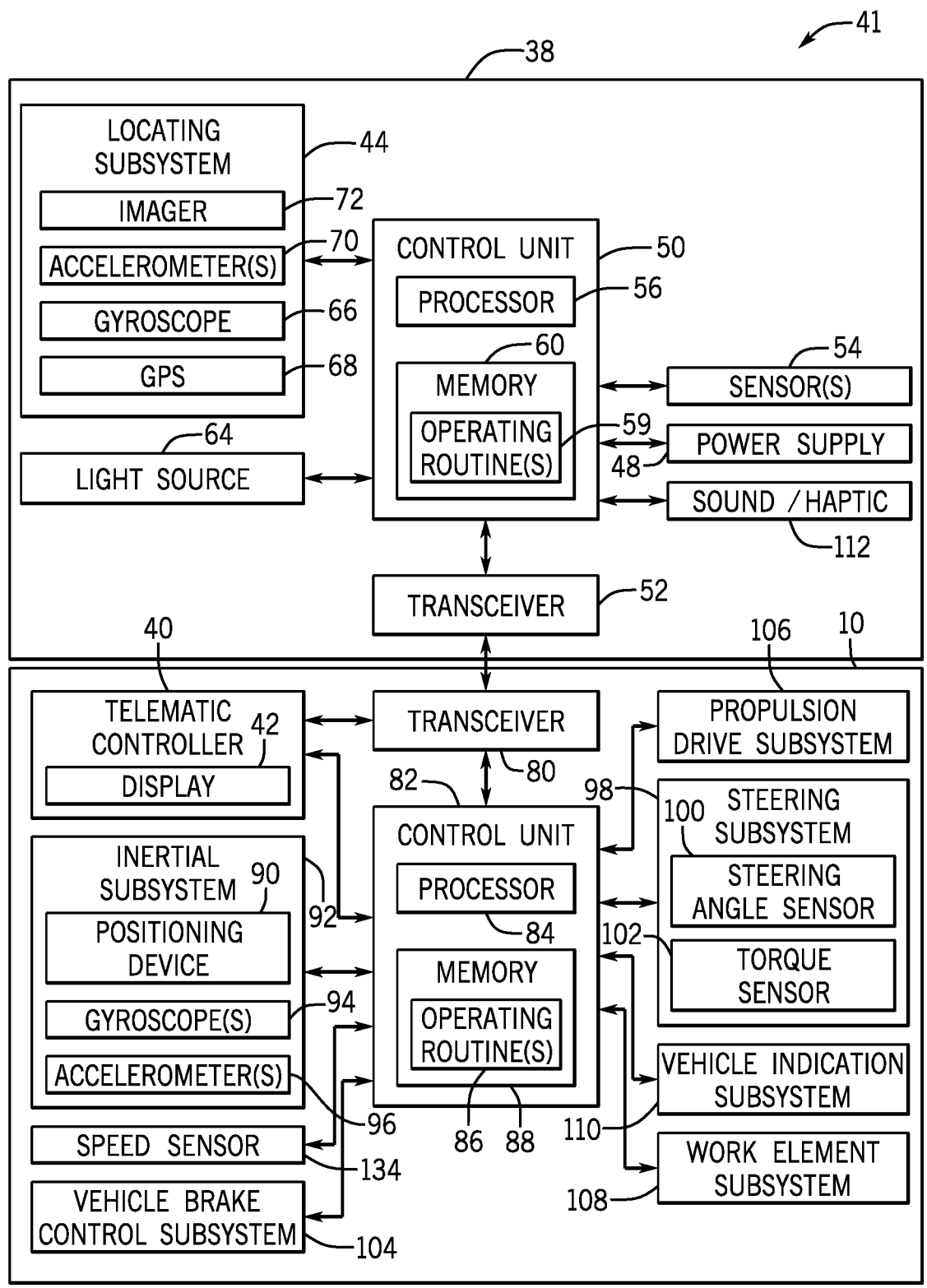
FIG. 4 is a block diagram of an exemplary safety reinforcement system, according to aspects of the present disclosure.

In some embodiments, the telematic controller 40 and the MHV control unit 82 may comprise the same control unit (e.g., the same control unit may operate as both the telematic controller 40 and the MHV control unit 82). In some embodiments, for example as shown in FIG. 4, the telematic controller 40 may be separate from the MHV control unit 82 and communicatively coupled therewith (e.g. directly, via the transceiver 80, or the like). In some such embodiments, the transceiver of the telematic controller 40 may communicate with transceivers of both the PPE electronics 38 and the MHV 10, for example in the arrangement illustrated in FIG. 5. In some embodiments, because the telematics controller 40 may communicate with the PPE device 28 used with the MHV 10, and the MHV control unit 82 performs functions for the MHV 10, one or both of the telematics controller 40 and MHV control unit 82 may be co-located with (e.g., physically attached to) the MHV 10. In other words, the MHV control unit 82 and/or telematic controller 40 may comprise a control unit co-located with the MHV 10.

Figure 6:
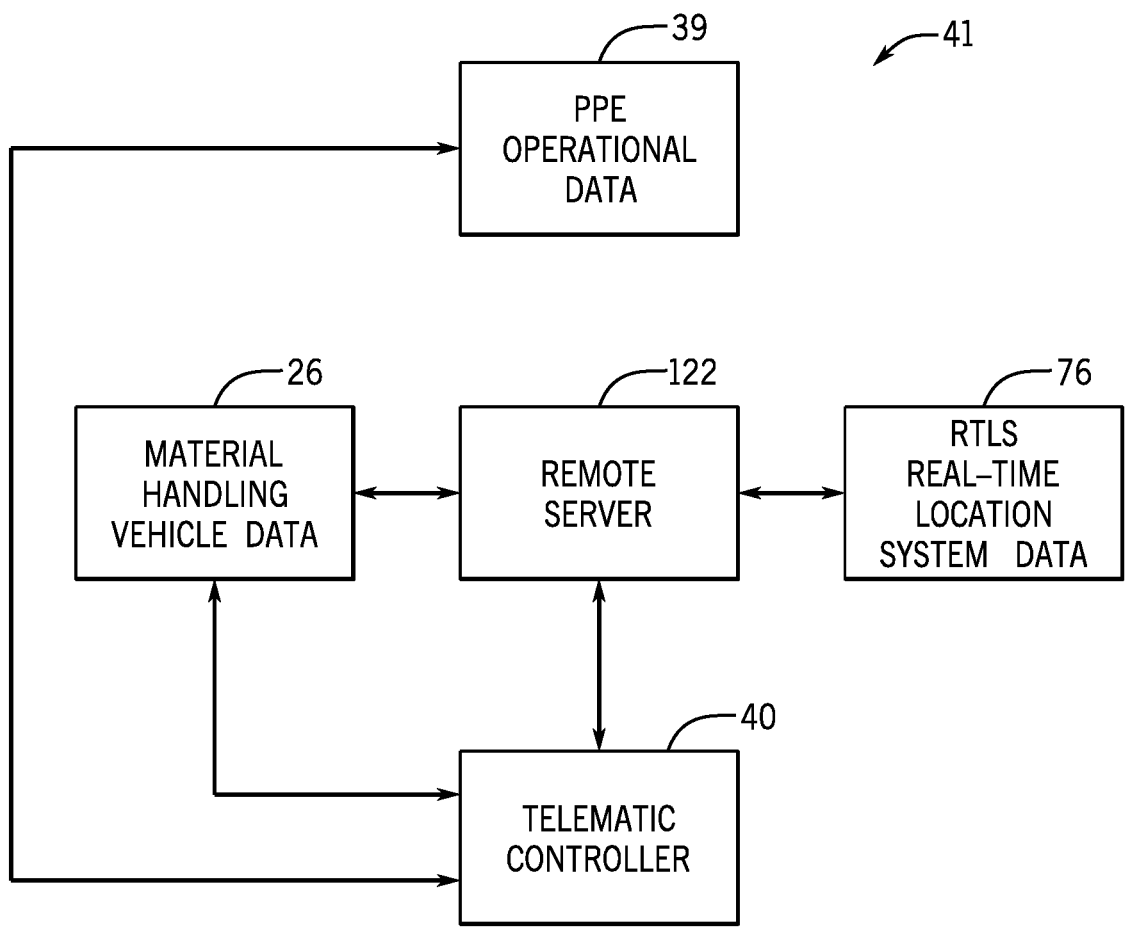
FIG. 6 is a data flow diagram illustrating an exemplary operational environment of a safety reinforcement device, according to aspects of the present disclosure.

Briefly referring to FIG. 6, the inclusion of PPE electronics 38 with the PPE device 28 and the use of a telematic controller 40 allows for the coordination of the telematics awareness of MHV data 26 with the PPE operational data. As discussed above, the PPE information communicated can include any details to provide information regarding proper usage of the PPE device 28 or other status information regarding the PPE device 28. For example, the PPE electronics 38 allows the SRL 34 to communicate the status of the SRL clasp 46B and if it is attached to the safety harness 32. The PPE electronics 38 can also report other operating conditions or, when equipped with a battery, a battery status.

Figure 7:
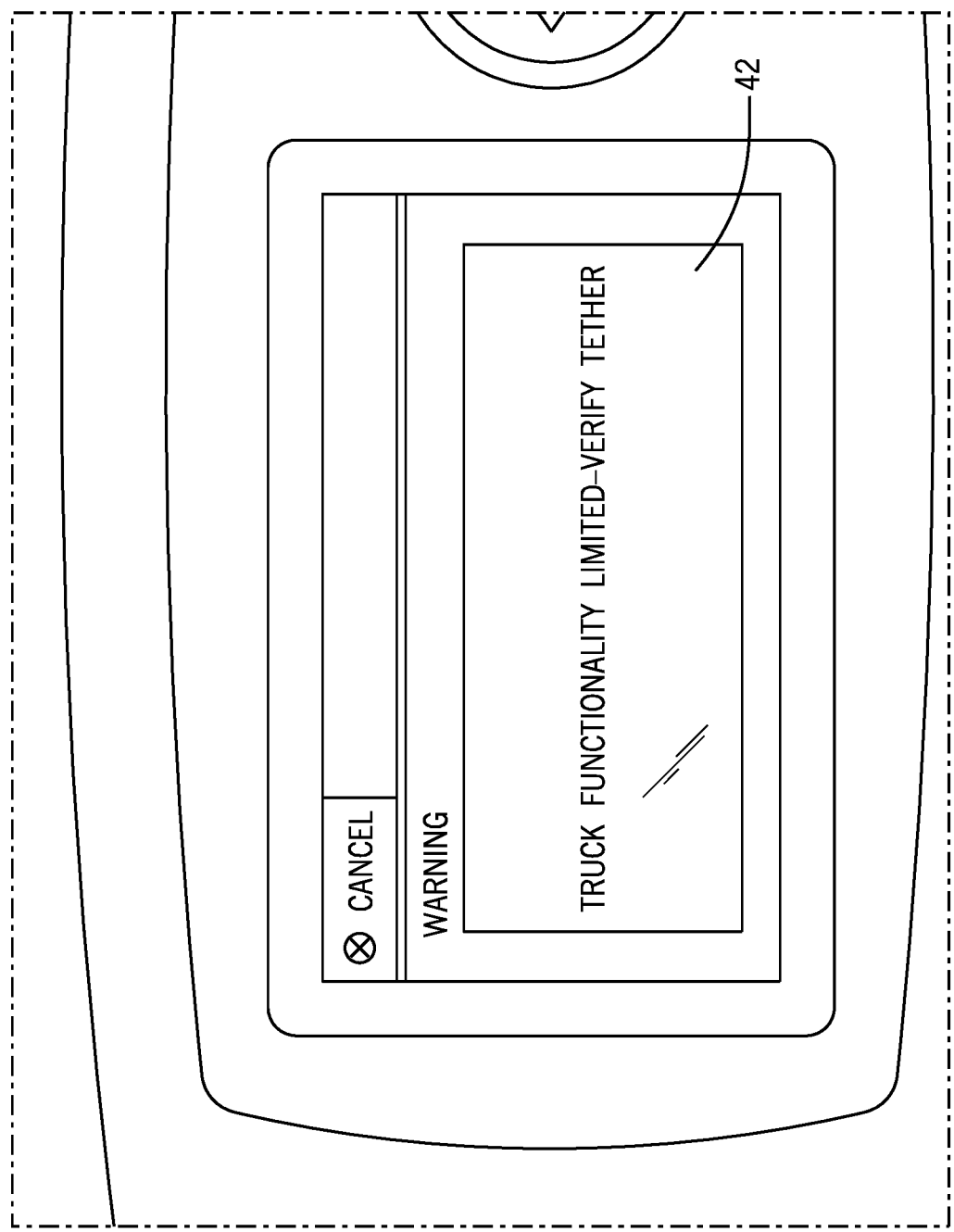
FIG. 7 is a first exemplary view of a display showing safety reinforcement device information, according to aspects of the present disclosure.
Figure 8:
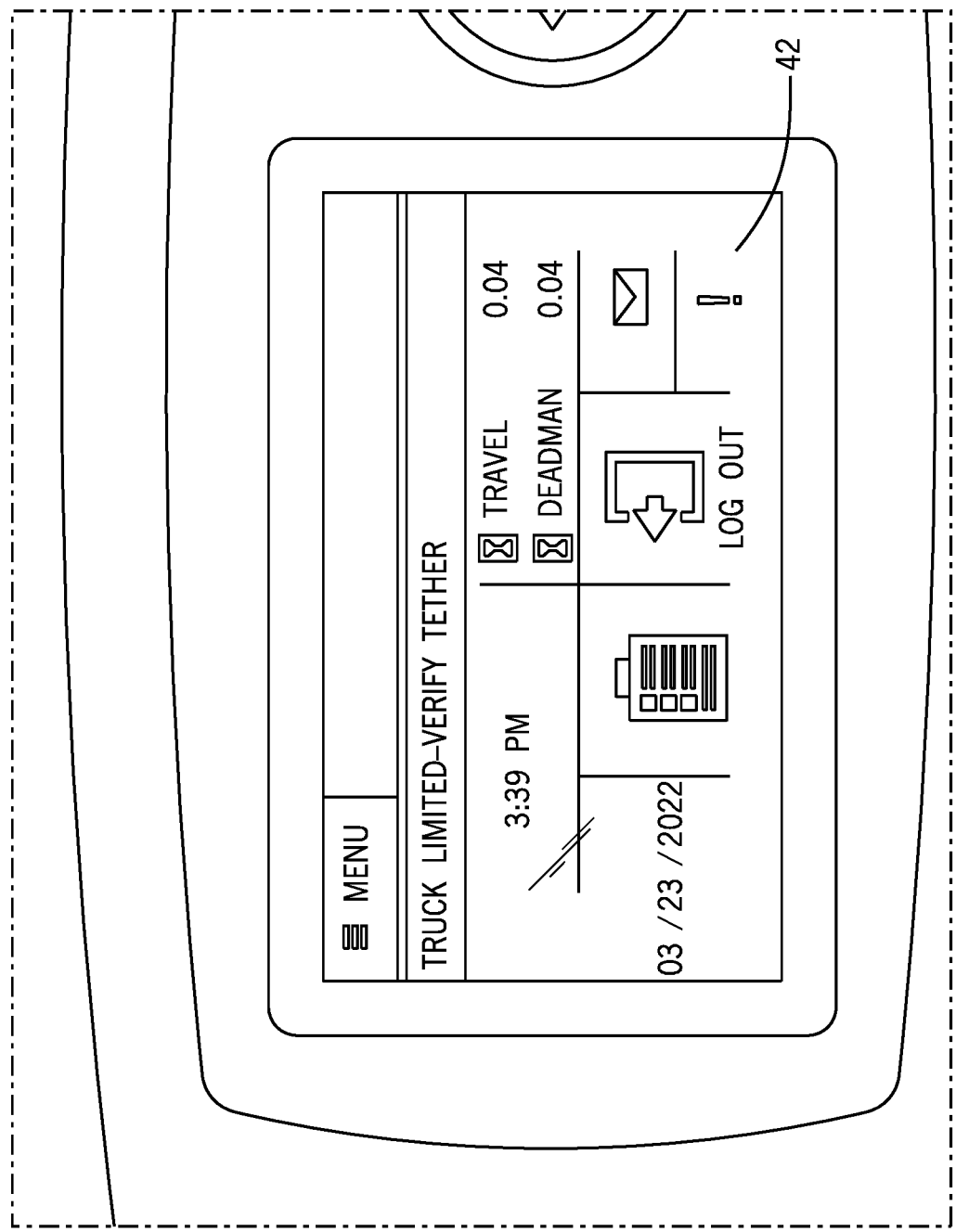
FIG. 8 is a second exemplary view of a display showing safety reinforcement device information, according to aspects of the present disclosure.
Figure 9:
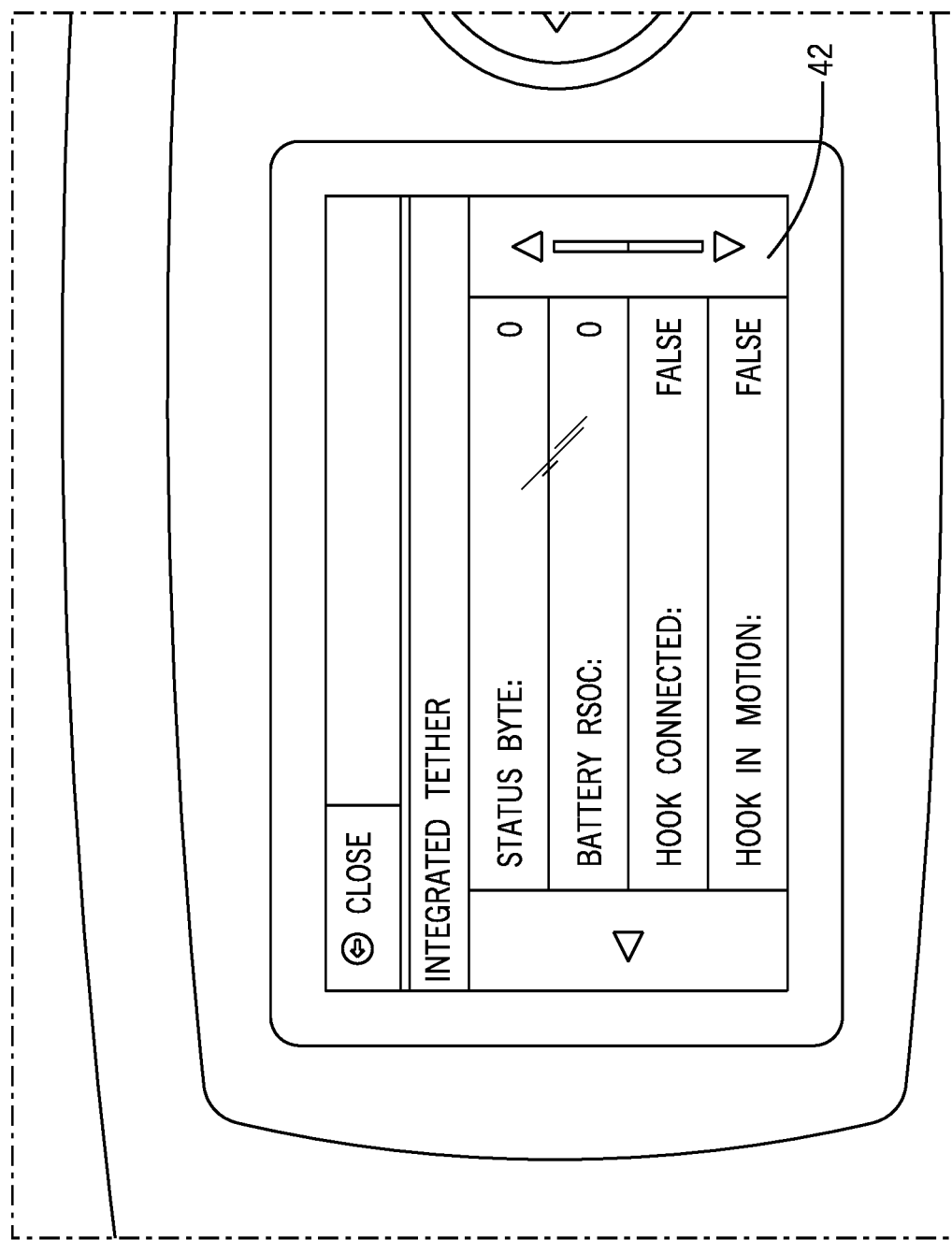
FIG. 9 is a third exemplary view of a display showing safety reinforcement device information, according to aspects of the present disclosure.

The PPE operational data 39 when combined with the current MHV data 26, for example lift height or travel speed, can provide the situational awareness to allow the lift to lower in certain cases and not lift in certain cases, as well as to allow travel or to limit travel, as non-limiting examples. Other examples include controlling any combination of aspects of vehicle travel including speed, steer angle, load handling devices and attachments, mast height, and the like. In some embodiments, the telematic awareness and response to the communicated PPE operational data 39 can be conveyed through a display 42 of the telematic controller 40 with unique graphical or information messages (see e.g., FIGS. 7-9), and can trigger corresponding MHV 10 responses and indicators, e.g., reduced speed and/or a horn.

The PPE operational data 39 when considered with the MHV data 26 can be processed based on a set of governing rules as to whether adjustments or limits should be applied to one or more MHV 10 control subsystems, including for example, to the MHV lift and or propulsion subsystems. For example, if the PPE device 28 is not properly engaged (e.g., SRL 34 is not connected to the safety harness 32), then the ability to lift can be disabled and the travel speed can be reduced. The PPE governing rules can be different based on the MHV model, type of PPE, or MHV configuration and the MHV's specific capabilities, or any combination thereof. The governing rules could also be configured based on the customer requirements or facility requirements. Other MHV control subsystem limits could also be applied as required to provide for adherence to company standard operating procedures for the MHV 10 and use of the PPE device 28.

In some examples, such as illustrated in FIG. 4, the PPE electronics 38 may include several different components and subsystems. For example, the components coupled to or included with the PPE electronics 38 may include a locating system 44, a power supply 48, the control unit 50, a wired and/or wireless transceiver 52, and/or one or more peripherals, such as various additional sensors 54, light sources 64, and sound and/or haptic devices 112 such as a speaker, vibration motor, or a microphone. Components of the PPE electronics 38 may be configured to work in an interconnected fashion with each other and/or with other components coupled to respective systems. For example, the power supply 48 may provide power to all the components of the PPE electronics 38 and may include, for example, a rechargeable lithium-ion battery. Additionally and/or alternatively, the power supply 48 may be disposed remotely from the PPE electronics 38. For example, the PPE electronics 38 may be powered by a battery of the MHV 10 rather than supplying its own power. The control unit 50 may receive information from and control the locating subsystem 44 and any of the peripherals.

The locating subsystem 44 may include a gyroscope 66, a global positioning system (GPS) 68, an accelerometer 70, an imager 72, and/or any other suitable device for determining a location of the PPE device 28. The locating subsystem 44 may be configured to provide information associated with a position and an orientation of the PPE device 28 to the control unit 50. The gyroscope 66 may include a microelectromechanical system (MEMS) gyroscope or a fiber optic gyroscope as examples. The gyroscope 66 may be configured to provide orientation information to the control unit 50. The GPS unit 68 may include a receiver that obtains clock and other signals from GPS satellites and may be configured to provide real-time location information to the control unit 50. The locating subsystem 44 may further include an accelerometer 70 configured to provide motion input data to the control unit 50. Briefly referring to FIG. 6, a real-time location system ("RTLS") 74, described in more detail below, may also be integrated with or otherwise implemented for the MHV 10 and/or the PPE device 28 to provide respective location specific data.

Figure 5:
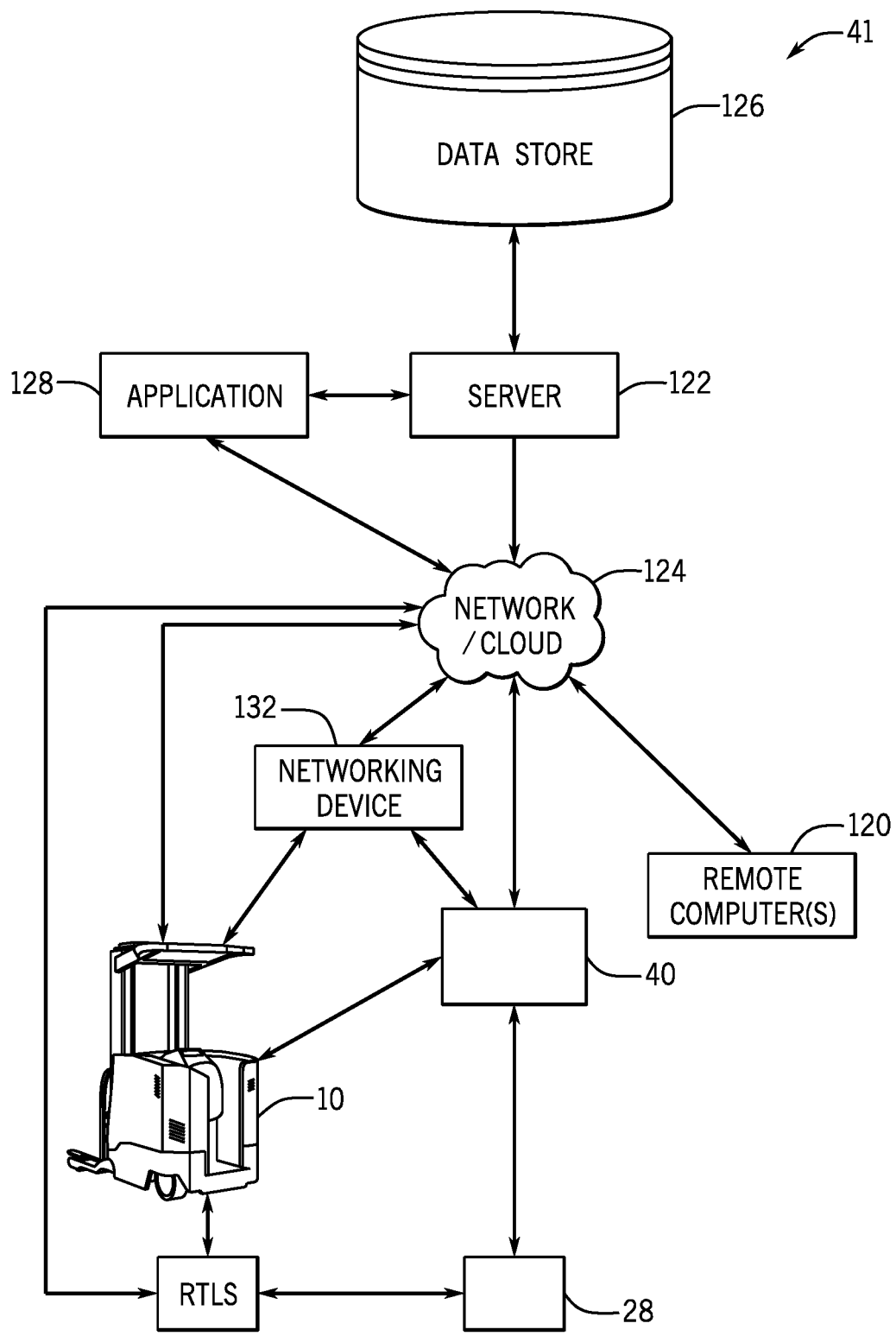
FIG. 5 is a block diagram illustrating an exemplary operational environment of a safety reinforcement system, according to aspects of the present disclosure.

With further reference to FIGS. 4-6, in some examples, the PPE device 28 may communicate via wired and/or wireless communication with the MHV 10 through corresponding transceivers 52, 80. In some embodiments, where the telematic controller 40 is separate from the MHV 10 (but still possibly co-located), the PPE device 28 may communicate with the telematic controller 40 via a corresponding transceiver (not shown) of the telematic controller 40. In some such embodiments, the PPE device 28 may not directly communicate with MHV 10 and instead may communicate directly with the telematic controller 40. Further, the telematic controller 40 may communicate with the MHV 10 through corresponding transceivers. Thus, in such embodiments, both the MHV 10 and the PPE device 28 may directly communicate with the telematic controller 40, and the telematic controller 40 may manage the information received from both the MHV 10 and PPE device 28.

The respective communication may occur through one or more of any desired combination of wired (e.g., cable and fiber) and/or wireless communication protocols and any desired network topology (or topologies when multiple communication mechanisms are utilized). Exemplary communication technologies include Bluetooth, Zigbee, Wi-Fi, IrDA, RFID, local area networks (LAN), and/or wide area networks (WAN), including the Internet, cellular, satellite, microwave, and radio frequency, providing data communication services.

The MHV transceiver 80 may further communicate with the control unit 82 of the MHV 10. Information from the PPE device 28, telematic controller 40, or other components of the MHV 10 can be supplied to the control unit 82 via a communication network of the MHV 10, which can include a controller area network (CAN), a local interconnect network (LIN), or other protocols. It should be appreciated that the control unit 82 may be a stand-alone dedicated controller or may be a shared controller integrated with the telematic controller 40, PPE electronics 38, or another component of the MHV 10 in addition to any other conceivable onboard or off-board vehicle control systems.

With reference to the embodiment shown in FIG. 4, the control unit 82 may communicate with an inertial subsystem 92 including one or more gyroscopes 94, and/or accelerometers 96 to measure the position, orientation, direction, and/or speed of the MHV 10. Additional vehicle-related information may be provided to the control unit 82 by a positioning device 90, such as a global positioning system (GPS) located on the MHV 10 and/or the GPS 68 on the PPE electronics 38.

In some instances, the control unit 82 of MHV 10 may be further configured to communicate with and control a variety of vehicle equipment, which may comprise subsystems of the MHV 10 and some of which may provide functions or other capabilities to the MHV 10. Therefore, the control unit 82 of the MHV 10 may be alternatively referred to as a subsystem controller 82. For example, the control unit 82 of the MHV 10 may be communicatively coupled with a steering subsystem 98 of the MHV 10 to operate the steered wheels 14 of the MHV 10. The steering subsystem 98 may include a steering angle sensor 100. In some embodiments, a steering wheel (not shown) of the MHV 10 may be mechanically coupled with the steered wheels 58 of the MHV 10 such that the steering wheel moves in concert with steered wheels 58 via an internal torque or linkage. In such instances, the steering system 98 may include a torque sensor 102 that senses torque (e.g., gripping and/or turning) on the steering wheel indicative of manual intervention by the operator 30.

The control unit 82 of the MHV 10 may also communicate with a vehicle brake control subsystem 104 of the MHV 10 to receive vehicle speed information such as individual wheel speeds of the MHV 10. Additionally or alternatively, vehicle speed information may be provided to the control unit 82 by a propulsion drive subsystem 106 and/or a vehicle speed sensor 134, among other suitable techniques. The propulsion drive subsystem 106 may provide a motive force for moving the MHV 10 in a designated travel direction at a controlled speed.

The MHV 10 may further include a work element subsystem 108 that manipulates a work element or function, such as the fork assembly 22 generally illustrated in FIG. 1A. In various examples, for a lift subsystem, the work element subsystem 108 can send command signals to control a lift motor that is connected to a hydraulic circuit that forms a lift assembly for raising, lowering, or otherwise manipulating the work element. In some examples, a position sensor provides a signal to the control unit 82 indicating the height of the work element. Similarly, a weight sensor can be provided on the work element. A load presence sensor, such as a radio frequency identification (RFID) tag reader or a bar code reader, for example, can also be mounted on the MHV 10 to identify the goods being transported. In some examples, the work element subsystem 108 may manipulate and/or include a reach actuator, a lift motor, and/or a mast tilt actuator (not shown).

In some instances, use of the safety reinforcement system 41 provided herein may encourage the operator 30 to continue to have required operating habits of the MHV 10, which may be reinforced even after the formal training period is complete and throughout the entire warehouse, rather than just locations where warehouse managers can observe use of the MHV 10. In addition, the safety reinforcement system 41 can identify certain activities and bring them to the attention of the operator 30 and/or the warehouse manager. Thus, it is conceivable that operators 30 will mitigate certain activities since they know that others are monitoring their actions. To this end, warehouse managers can see a representative sample of operator conduct in the warehouse. In this way, the safety reinforcement system 41 can serve as an indicator to identify activities before an event may occur.

According to some examples, the control unit 82 may communicate with a vehicle indication subsystem 110, which may prompt visual, auditory, and tactile indications if certain conditions are determined. For instance, one or more light sources 64 on the PPE device 28, telematic controller 40, and/or MHV 10 may provide a visual indication and a vehicle horn and/or a speaker may provide an audible indication 112. Additionally, the MHV 10, telematic controller 40, and/or the PPE device 28 may provide haptic or tactile feedback 112 to indicate to the operator 30 that certain conditions are determined.

Referring to FIGS. 5 and 6, in some examples, the MHV 10, the telematic controller 40, and/or a remote computer 120 may be communicatively coupled with one or more remote sites such as a remote server 122 via a network/cloud 124, which for further example may be components of a material handling vehicle fleet management system or other such warehouse management system. The network/cloud 124 represents one or more systems by which the MHV 10, the telematic controller 40, and/or the remote computer 120 may communicate with the remote server 122. Accordingly, the network/cloud 124 may be one or more of various wired or wireless communication mechanisms, including any desired combination of wired and/or wireless communication mechanisms and any desired network topology or topologies. Exemplary communication networks 124 include wireless communication networks (e.g., using Bluetooth, IEEE 802.11, or the like), local area networks (LAN) and/or wide area networks (WAN), including cellular networks, satellite networks, microwave networks, radio frequency networks, the Internet and the Web, which all may provide data communication services and/or cloud computing services. The Internet is generally a global data communications system that is a hardware and software infrastructure, which provides connectivity between computers. The Web is generally one of the services communicated via the Internet. The Web is generally a collection of interconnected documents and other resources, linked by hyperlinks and URLs. In many technical illustrations when the precise location or interrelation of Internet resources are generally illustrated, extended networks such as the Internet are often depicted as a cloud (e.g., 124 in FIG. 5). The National Institute of Standards and Technology (NIST) provides a definition of cloud computing as "a model for enabling convenient, on-demand network access to a shared pool of configurable computing resources (e.g., networks, servers, storage, applications, and services) that can be rapidly provisioned and released with minimal management effort or service provider interaction." Although the terms Internet, the Web, and cloud computing may refer to different aspects of a networked computing devices, these terms are generally used interchangeably herein, and they may be referred to collectively as the network/cloud 124.

The server 122 may be one or more computer servers, each of which may include at least one processor and at least one memory, the memory storing instructions executable by the processor, including instructions for carrying out various steps and processes. The server 122 may include or be communicatively coupled to a data store 126 for storing collected data as well as instructions for operating the MHV 10, the control unit 82, the telematic controller 40, the PPE device 28, the controller 50 of the PPE device 28, etc., that may be directed to and/or implemented by the respective control unit(s) with or without intervention from an operator 30 and/or the remote computer 120.

In some examples, the instructions, for example operating routine(s), may be input through the remote computer 120 and relayed to the server 122. Those instructions may be stored in the server 122 and/or data store 126. At various predefined periods and/or times, or based upon other suitable trigger(s) (e.g., connection of a new PPE device 28, startup of the MHV 10, etc.), the MHV 10 and/or the telematic controller 40 may communicate with the server 122 through the network/cloud 124 to obtain the stored instructions, if any exist. Upon receiving the stored instructions, the MHV 10 and/or the telematic controller 40 may implement the instructions. A direct instruction to do/not do something may be implemented by the MHV 10, for example stopping in response to an instruction to stop. An instruction that comprises an operating routine may be stored in memory, for example of the telematic controller 40, for immediate or later use by a processor. The server 122 may additionally store information related to PPE devices 28, MHVs 10, routes, etc., and operate and/or provide instructions to the MHV 10 and/or the telematic controller 40 in conjunction with the stored information with or without intervention from an operator 30 and/or the remote computer 120. Accordingly, in some examples, the operating routines 59 of the telematic controller 40 may be accessed through the network/cloud 124 and the telematic controller 40 is configured to stream data to operate the telematic controller 40, PPE device 28, and/or MHV 10.

Referring again to FIG. 5, a RTLS 74 may be implemented to track the location of various components of the safety reinforcement system 41. For example, the RTLS 74 may comprise tags, badges, or the like affixed to (or otherwise included with) the operator 30, MHV 10, PPE device 28, telematic controller 40, and the like, and may comprise anchors arranged proximate to the operating area of the MHV 10. The anchors may be placed at fixed locations to establish a reference location framework and may track the position of the tags, badges, etc. The anchors may communicate with each other or to a predetermined anchor, and may communicate relevant information (e.g., RTLS data 76) to the server 122 through the network/cloud 124.

With further reference to FIGS. 5 and 6, the server 122 can also generally implement features that may enable the MHV 10, telematic controller 40, and/or the PPE device 28 to communicate with cloud-based applications 128. Communications from the MHV 10 or telematic controller 40 can be directed through the network/cloud 124 to the server 122 and/or cloud-based applications 128 with or without a networking device 132, such as a router and/or modem. Additionally, communications from the cloud-based applications 128, even though these communications may indicate one of the MHV 10, telematic controller 40, and/or the remote computer 120 as an intended recipient, can also be directed to the server 122. The cloud-based applications 128 are generally any appropriate services or applications 128 that are accessible through any part of the network/cloud 124 and may be capable of interacting with the MHV 10, telematic controller 40, PPE device 28, and/or the remote computer 120. In some embodiments, the could-based application 128 may comprise an operating routine as discussed in more detail below.

In various examples, the telematic controller 40 can be feature-rich with respect to communication capabilities, e.g., have built-in capabilities to access the network/cloud 124 and any of the cloud-based applications 128 or can be loaded with, or programmed to have, such capabilities. The telematic controller 40 may also be configured to access any part of the network/cloud 124 through industry standard wired or wireless access points, cell phone cells, network nodes, or the like. In some examples, operators 30 can register to use the remote server 122 through the telematic controller 40 (e.g., log in to a warehouse management system), which may provide access to the MHV 10 and/or the remote computer 120 and/or thereby allow the server 122 to communicate directly or indirectly with the MHV 10 and/or the remote computer 120. In various instances, the MHV 10 and/or the telematic controller 40 may also communicate directly, or indirectly, with the remote computer 120 or one of the cloud-based applications 128 in addition to communicating with or through the server 122. According to some examples, the MHV 10, telematic controller 40, and/or the remote computer 120 can be preconfigured at the time of manufacture with a communication address (e.g., a URL, an IP address, etc.) for communicating with the server 122 and may or may not have the ability to upgrade or change or add to the preconfigured communication address.

Referring still to FIG. 5, when a new cloud-based application 128 (e.g., an operating routine for a new PPE device 28) is developed and introduced, the server 122 can be updated to be able to receive communications for the new cloud-based application 128, to store and/or retrieve respective operating routine(s), to translate between the protocol for the new PPE device 28 and a common protocol (described below), provide operating routine(s) for translation and/or governing rules to the telematic controller 40, and the like.

In addition, in various examples, during use, various events and maneuvers of the MHV 10 by an operator 30 can be logged and communicated to the remote server 122 for data analytics and reporting. In some embodiments, the telematic controller 40 may identify operators 30 by badge scanning, PIN number, or the like, or via communication with the MHV 10 for login credentials. The use of the telematic controller 40 may begin at the start of the shift. The telematic controller 40 may communicate operator 30 identification to the remote server 122 along with other collected data (e.g., telemetric data) regarding use of the MHV 10 by the operator 30.

In some examples, the control unit 82 and/or the remote server 122 may communicate additional information about the MHV 10 to the telematic controller 40, such as the wheelbase, overall width, work element configuration and capabilities, information about the configuration and/or capabilities of the various MHV 10 subsystems, and the like. The MHV 10 may also communicate vehicle kinematic information, such as a steering angle or propulsion drive system 106 conditions to the telematic controller 40.

As described above, the safety reinforcement system 41 may be configured to operate with a variety of PPE devices 28. The MHV 10, telematic controller 40, and/or remote server 122 may operate using a predetermined common communication protocol, data format, data definitions, and the like (which collectively may be referred to herein as a "common protocol"), facilitating efficient communication among these devices. In some embodiments, the common protocol may be determined based on the particular warehouse management system implementation, for example as implemented by the server 122. To the contrary, each PPE device 28 may use its own communication method, communication protocol, data formatting, or the like. Further, new PPE devices 28 may be introduced to the safety reinforcement system 41 at any time. In some embodiments, the safety reinforcement system 41 may be configured to flexibly adapt for any such PPE device 28.

As described above, the PPE device 28 may be configured to communicate PPE operational data 39, and the MHV 10 (e.g., subsystem controller 82) and/or the telematics controller 40 may be configured to receive the communicated PPE operational data 39. The PPE device 28 may be further configured to communicate an identification of the PPE device 28, which may comprise suitable identifying information to allow the safety reinforcement system 41 to understand the functionalities of the PPE device 28. In some embodiments, the PPE device 28 identification may comprise the manufacturer, model, serial number, Media Access Control (MAC) address, PPE type (e.g., SRL, hard hat, etc.), capabilities (e.g., strength, capacity, functional limits, etc.), and/or configuration (enabled/disabled functionality, firmware revision, etc.) of the PPE device 28. The PPE device 28 may communicate the identification once upon initial communicative connection to the MHV 10 and/or telematic controller 40, periodically, with every data transmission, or any other suitable arrangement.

The telematic controller 40 may be configured to receive the PPE device 28 identification and communicate the identification to the server 122. The server 122 may be configured with configuration information pertaining (e.g., associated with or otherwise applicable to) to the identified PPE device 28, for example via one or more applications 128, information loaded into the data store 126, or the like. The configuration information for the identified PPE device 28 may comprise suitable information to allow the safety reinforcement system 41 to receive and interpret PPE operational data 39, to allow the safety reinforcement system 41 to react appropriately to the PPE operational data 39, or the like. Upon receiving the PPE device 28 identification from the telematic controller 40, the server 122 may retrieve configuration information corresponding to the identified PPE device (e.g., according to an appropriate application 128, from the data store 126, etc.) and may transmit the configuration information to the telematic controller 40.

The configuration information may comprise one or more operating routines which may comprise one or more software-based instructions and/or parameters storable in memory (e.g., a memory of the telematic controller 40 and/or MHV control unit 82) and executable by a respective processor. In some embodiments, the configuration information may comprise a translation operating routine configured to convert the PPE operational data 39 to a common protocol, such as the common protocol used by the telematic controller 40. For example, the safety reinforcement system 41 may operate on one messaging protocol, data format, and the like, whereas each PPE device 28 (depending on manufacturer, type, etc.) may have its own defined messaging protocol, data format, and the like. The translation routine may comprise a set of instructions (e.g., software routine) for converting the PPE operational data 39, may comprise a look-up table to identify how each portion (e.g., bit, byte, etc.) of PPE operational data 39 is defined and/or what the values represent, or the like. For example, a lookup table or scaling value may be used to convert a number from the PPE device 28 representing battery charge level to a battery percentage format usable by the telematic controller 40.

In some embodiments, the configuration information (e.g., operating routine(s)) may comprise one or more governing rules for the identified PPE device 28. A governing rule may indicate the allowable operational limits of the PPE device 28, which if exceeded or otherwise violated may require appropriately limiting the operation of the MHV 10 to protect the operator 30 or other personnel or equipment. In some non-limiting examples, governing rules may indicate an acceptable charge level of the PPE device battery 28, acceptable values with respect to the protection portion 46 (e.g., whether the protection portion 46 is properly engaged), location rules for the PPE device 28 (e.g., a geofence, maximum allowed distance from the MHV 10, etc.), and the like. In some embodiments, the governing rules may be based on the identity of the operator 30, which the telematic controller 40 may obtain directly or from the MHV 10 and/or PPE device 28, and which the telematic controller 40 may provide to the server 122. For example, a less experienced operator may have more restrictions (more strict governing rules) compared to a more experienced operator, or a trainee operator may have a restriction that does not apply to non-trainee operators. The telematics controller 40 may confirm that the operator 30 is allowed (e.g., licensed) to operate the MHV 10 and/or PPE device 28, which may be part of a governing rule or otherwise indicated by the server 122.

In some embodiments, the governing rules may be based on the type and/or configuration of the MHV 10. For example, lift-type vehicles may have a governing rule corresponding to a height of a lift unit (e.g., controlled by a lift subsystem which may be part of the work element subsystem 108), whereas non-lift type vehicles may have rules corresponding to other work elements. For further example, a lift-type vehicle may have different configurations of work elements couplable with the lift system and appropriate corresponding governing rules. In some embodiments, the governing rule may incorporate positional awareness, for example based on RTLS data 76. For example, the governing rule may require use of a specified PPE device 28 within a predetermined region of a facility in which the MHV 10 operates.

The telematic controller 40 may compare the received PPE operational data 39 to the received governing rules, and in some cases may use the received translation routine to first translate or otherwise interpret the PPE operational data 39. If the telematic controller 40 determines that the use of the PPE device 28 exceeds or otherwise violates the governing rules, then the telematic controller 40 may transmit a limiting instruction to the MHV control unit 82 or one of the other MHV 10 subsystems directly. In some embodiments, the telematic controller 40 may determine whether to transmit a limiting instruction, and which limiting instruction to transmit, based on the PPE operational data 39 in combination with received MHV data 26.

Analysis of the PPE operational data 39 using the governing rules can trigger an indication to facility management through text messaging, email, or other known wired or wireless electronic communication protocols, for example via the telematic controller 40 or server 122. Analysis of the PPE operation data 39 using the governing rules can trigger an indication in the facility by activating lights or sounds, for example via the telematic controller 40 or MHV 10. While some of the exemplary embodiments discussed above relate to the telematic controller 40 performing the translation routine and/or governing rules, in other embodiments the server 122 may perform the translation routine and/or governing rules and send the limiting instruction to the telematic controller 40, subsystem controller 82, MHV 10 subsystem, and so on. Analysis, by the safety reinforcement system 41, of the PPE operational data 39 using the governing rules can be logged by operator, date, time and location and be presented in a written or graphical report based on data collected through a wired or wireless interface of the telematic controller 40.

The safety reinforcement system 41 (e.g., by telematic controller 40, server 122, etc.) can be configured to store information regarding various aspects of the system, such as proper connection or use of the PPE device 28, and length of use of the PPE device 28, as non-limiting examples. The stored data can be time and/or date stamped, and/or marked according to the particular operator 30 using the MHV 10 and/or PPE device 28 at the time. The stored data can be transmitted, for example using the telematic controller 40 and/or server 122, and/or can be stored locally in memory storage for later retrieval.

The limiting instruction may comprise any suitable electrical signal, setting, instruction, or the like capable of limiting an operation or other function/capability of the MHV 10. In some non-limiting examples, the limiting instruction may comprise an enable/disable signal or setting, a speed limit, a lift height limit, a stop or slow instruction, a steering limit, other auxiliary function/capability limits, or the like. The limiting instruction may be transient or non-transient (e.g., stored by the respective subsystem or not stored). The limiting instruction may be in the common protocol, and/or may be in a vehicle-specific protocol if other than the common protocol. Likewise, a limit-clearing instruction may be an instruction of the same form but configured to clear or otherwise remove a previously-enforced vehicle limit. In some embodiments, a limit-clearing instruction may be transmitted when a subsequent PPE operational data 39, possibly in combination with MHV data 26, indicates that the respective governing rule is not (or no longer) violated.

For example, if the PPE operational data 39 indicates that the PPE device 28 in not properly engaged, then the telematic controller 40 may transmit a limiting instruction to the MHV 10 to reduce or otherwise limit the speed and/or lift height of the MHV 10. In some embodiments, the telematic controller 40 may determine to send a limiting instruction based on the MHV data 26, for example only sending a limiting instruction when the MHV data 26 indicates that the MHV 10 is in motion (e.g., the PPE device 28 being in an unengaged state might be acceptable if the MHV 10 is stopped). The telematic controller 40 may consider the current speed of the MHV 10, the height of a carriage, operator cabin, work element, or the like, the status of other subsystems of the MHV 10, operation mode (e.g., whether the MHV 10 is in use or parked, whether a user is logged in, a MHV 10 training mode, maintenance mode, calibration mode, etc.), and so on. The telematic controller 40 may transmit the limiting instruction directly to the work element subsystem 108 and/or propulsion drive subsystem 106, or to the MHV control unit 82 (i.e., subsystem controller) which may enforce the respective limits.

Advantageously, according to the present disclosure, the telematics controller 40 and MHV 10 can operate with a variety of PPE devices 28 without having to be pre-programmed for each PPE device 28. Because the server 122 can be updated with configuration information for new PPE devices 28, the telematics controller 40 and MHV 10 can continue to operate as normal without requiring offline updates. Further, the safety reinforcement system 41 may be configurable and customizable based on the needs of a warehouse in which it is implemented, customer requests, and so on. For example, the governing rules may be customized for a particular warehouse to require hard hats for only certain types of material handling vehicles such as a sit down counter balance and not for indoor order pickers, whereas a second warehouse may have no requirements for hard hat use.

In some implementations, devices or systems disclosed herein can be utilized or configured for operation using methods embodying aspects of the invention. Correspondingly, description herein of particular features, capabilities, or intended purposes of a device or system is generally intended to inherently include disclosure of a method of using such features for the intended purposes, a method implementing such capabilities, and a method of configuring disclosed (or otherwise known) components to support these purposes or capabilities. Similarly, unless otherwise indicated or limited, discussion herein of any method of manufacturing or using a particular device or system, including configuring the device or system for operation, is intended to inherently include disclosure, as embodiments of the invention, of the utilized features and implemented capabilities of such device or system.

Figure 10:
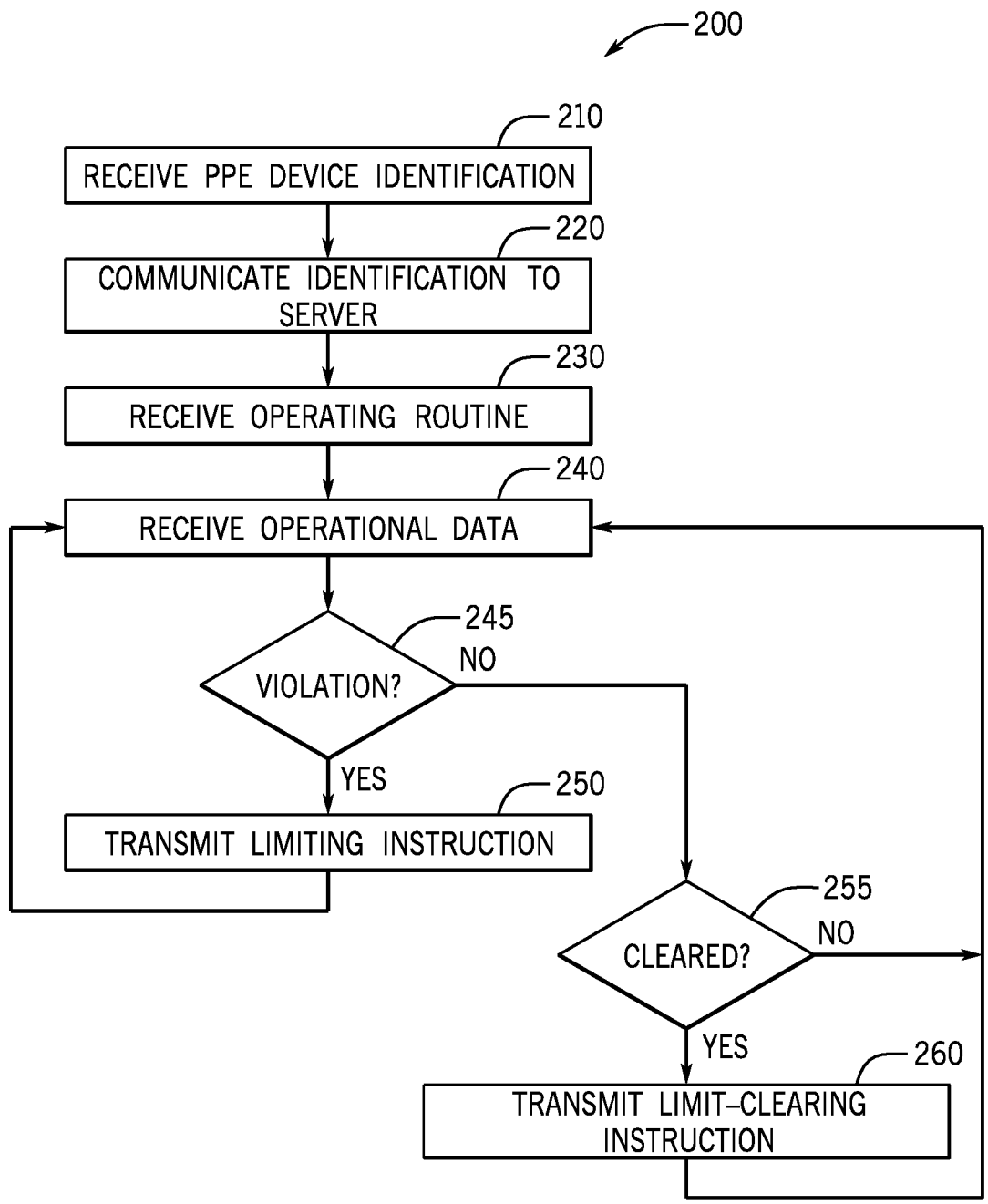
FIG. 10 illustrates a safety reinforcement method, according to aspects of the present disclosure.

Correspondingly, some embodiments of the present disclosure can include a method for providing safety reinforcement for a PPE device 28 used with a MHV 10. Referring to FIG. 10, a non-limiting example of a safety reinforcement method 200 is illustrated. In some embodiments, the safety reinforcement method 200 may be implemented in the telematic controller 40, for example, as operating routines stored in memory (e.g., as software). In some embodiments, the safety reinforcement method 200 may be implemented with a combination of the telematic controller 40, server 122, and/or MHV control unit 82. The safety reinforcement method 200 may comprise receiving 210 an identification from the PPE device 28, communicating 220 the identification to the server 122, receiving 230 an operating routine for the identified PPE device 28 from the server 122 in response to the identification, receiving 240 a first operational data from the PPE device 28, transmitting 250, according to the first operational data, a limiting instruction to a MHV 10 subsystem, and transmitting 260 a limit-clearing instruction to the MHV 10 subsystem in response to receiving a second operational data different from the first operational data.

At step 210, the safety reinforcement system 41 (e.g., telematic controller 40) may receive an identification from the PPE device 28. At step 220, the safety reinforcement system 41 (e.g., telematic controller 40) may communicate the PPE device 28 identification to the server 122 or other component of the safety reinforcement system 41. At step 230, the safety reinforcement system (e.g., telematic controller 40) may receive, for example from server 122, an operating routine associated with or otherwise appropriate for the identified PPE device 28. As described above, the operating routine may comprise a translation routine, governing rules, or the like.

At step 240, the safety reinforcement system 41 (e.g., telematic controller 40) may receive an operational data 39 from the PPE device 28. At step 245, the safety reinforcement system 41 (e.g., telematic controller 40) may determine if a function/capability of the MHV 10 should be limited. In some embodiments, at step 245, the safety reinforcement system 41 may translate, for example to a common protocol, the PPE operational data 39 according to an operating routine that comprises a translation routine. In some embodiments, at step 245, the safety reinforcement system 41 may determine if the PPE operational data 39 (first translated if necessary) violates one or more governing rules. In some embodiments, this determination may be made based on the PPE operational data 39 in combination with the MHV data 26.

A limiting instruction may be transmitted to a MHV 10 subsystem at step 250 based on the determination in step 245. As described above, the limiting instruction may limit one or more functions/capabilities of the MHV 10, for example lift height, speed, or the like. In some embodiments, the limiting instruction may cause indications such as vehicle lights, sirens, or the like to activate, or notices to be sent to warehouse personnel, server 122, or the like. After the limiting instruction is transmitted at step 250, the safety reinforcement system 41 may continue to receive additional PPE operational data 39.

In some embodiments, at step 255, the safety reinforcement system 41 (e.g., telematic controller 40) may determine whether the PPE operational data 39 indicates that a violation has been cleared or otherwise no longer exists. If the safety reinforcement system 41 determines that a violation has not been cleared or a limitation is otherwise not ready to be cleared, the safety reinforcement system 41 may continue to monitor additional PPE operational data 39. If the safety reinforcement system 41 determines a violation no longer exists or a limitation is otherwise ready to be cleared, it may send a limit-clearing instruction to the MHV 10 subsystem at step 260. After the limit-clearing instruction is transmitted at step 260, the safety reinforcement system 41 may continue to receive additional PPE operational data 39 and continue to check such operational data at step 245.

In addition, for certain types of vehicles there are training requirements imposed by various government agencies, laws, rules and regulations. For example, OSHA imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environment, and always look in the direction of travel.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Within this specification, embodiments have been described in a way which enables a clear and concise specification to be written, but it is intended and will be appreciated that embodiments may be variously combined or separated without parting from the present disclosure. For example, it will be appreciated that all preferred features described herein are applicable to all aspects of the present disclosure described herein.

Thus, while the present disclosure has been described in connection with particular embodiments and examples, the present disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the present disclosure are set forth in the following claims.

We claim:

1. A safety reinforcement system for a personal protective equipment (PPE) device for a material handling vehicle, comprising:
   a control unit co-located with the material handling vehicle and configured to:
   receive, via wireless communication, an identification from the PPE device;
   communicate the identification to a server;
   receive an operating routine for the identified PPE device from the server in response to the identification;
   receive, via wireless communication, a first operational data from the PPE device;
   transmit, according to the operating routine, a limiting instruction to a subsystem of the material handling vehicle; and limit a function of the material handling vehicle in response to the limiting instruction, the function of the material handling vehicle comprising a lift height of the material handling vehicle or a speed of the material handling vehicle, or a combination thereof.

2. The system of claim 1, wherein the subsystem comprises at least one selected from the group of a propulsion subsystem, a lift subsystem, and a subsystem controller.

3. The system of claim 1, wherein control unit is configured to:
   receive a vehicle data from the subsystem; and
   transmit the limiting instruction to the subsystem in response to the first operational data and the vehicle data.

4. The system of claim 3, wherein the vehicle data comprises at least one selected from the group of a speed of the material handling vehicle, a height of a lift of the material handling vehicle, and an operation mode of the material handling vehicle.

5. The system of claim 1, wherein the operating routine comprises a translation routine for the PPE device and the control unit is configured to:
   translate the received first operational data according to the translation routine; and
   transmit the limiting instruction to the subsystem based on the translated first operational data.

6. The system of claim 5, wherein the translation routine comprises a set of instructions configured to convert the first operational data to a common protocol for the control unit.

7. The system of claim 1, wherein the operating routine comprises a governing rule for the PPE device and the control unit is configured to:
   determine whether the first operational data indicates a violation of the governing rule; and
   transmit the limiting instruction to the subsystem in response to a determined violation.

8. The system of claim 7, wherein the governing rule is based on at least one selected from the group of a type of the material handling vehicle and a configuration of the material handling vehicle.

9. The system of claim 1, wherein control unit is further configured to transmit, in response to receiving a second operational data different from the first operational data, a limit-clearing instruction to the subsystem.

10. A safety reinforcement method for a personal protective equipment (PPE) device for a material handling vehicle, comprising:
    receiving, via a control unit co-located with the material handling vehicle, an identification from the PPE device;
    communicating, via the control unit, the identification to a server;
    receiving, via the control unit, an operating routine for the identified PPE device from the server in response to the identification;
    receiving, via the control unit, a first operational data from the PPE device; and
    transmitting, via the control unit and according to the operating routine, a limiting instruction to a subsystem of the material handling vehicle; and limiting a function of the material handling vehicle in response to the limiting instruction, the function of the material handling vehicle comprising a lift height of the material handling vehicle or a speed of the material handling vehicle, or a combination thereof.

11. The method of claim 10, wherein the subsystem comprises at least one selected from the group of a propulsion subsystem, a lift subsystem, and a subsystem controller.

12. The method of claim 10, further comprising:
    receiving, via the control unit, a vehicle data from the subsystem, wherein transmitting the limiting instruction according to the operating routine comprises transmitting the limiting instruction in response to the first operational data and the vehicle data.

13. The method of claim 12, wherein:
    the vehicle data comprises at least one selected from the group of a speed of the material handling vehicle, a height of a lift of the material handling vehicle, and an operation mode of the material handling vehicle.

14. The method of claim 10, wherein the operating routine comprises a translation routine for the PPE device and the method further comprises:
    translating, via the control unit, the received first operational data based on the translation routine, wherein transmitting the limiting instruction according to the operating routine comprises transmitting the limiting instruction based on the translated first operational data.

15. The method of claim 14, wherein the translation routine comprises a set of instructions configured to convert the first operational data to a common protocol for the control unit.

16. The method of claim 10, wherein the operating routine comprises a governing rule for the PPE device and the method further comprises:

determining, via the control unit, whether the first operational data indicates a violation of the governing rule, wherein transmitting the limiting instruction according to the operating routine comprises transmitting the limiting instruction to the subsystem in response to a determined violation.

17. The method of claim 16, wherein the governing rule is based on at least one selected from the group of a type of the material handling vehicle and a configuration of the material handling vehicle.

18. The method of claim 10, further comprising:
transmitting, via the control unit and in response to receiving a second operational data different from the first operational data, a limit-clearing instruction to the subsystem.

19. A safety reinforcement system for a personal protective equipment (PPE) device for a material handling vehicle, comprising a control unit configured to:

receive, via communicative coupling, an identification from the PPE device;
communicate the identification to a server;
receive a governing rule and a translation routine associated with the identified PPE device from the server in response to the identification;
receive an operational data from the PPE device;
translate the operational data according to the translation routine;
determine whether the translated operational data indicates a violation of the governing rule; and
limit a function of the material handling vehicle in response to the determined violation; wherein the function of the material handling vehicle comprising a lift height of the material handling vehicle or a speed of the material handling vehicle, or a combination thereof.

* * * * *